US012398855B2

(12) United States Patent
Schimon et al.

(10) Patent No.: US 12,398,855 B2
(45) Date of Patent: Aug. 26, 2025

(54) LENS SYSTEM WITH APERTURE AND BRIGHTENING DEVICE FOR DIRECTING LIGHT BEAMS TO PRIMARY AND SECONDARY AREAS OF LENS DEVICE RESPECTIVELY

(71) Applicant: HELLA GMBH & CO. KGAA, Lippstadt (DE)

(72) Inventors: Christian Schimon, Lippstadt (DE); Alexander Schwan, Kamen (DE); Markus Stuhldreher, Olsberg (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 18/822,637

(22) Filed: Sep. 3, 2024

(65) Prior Publication Data

US 2025/0075870 A1 Mar. 6, 2025

(30) Foreign Application Priority Data

Sep. 5, 2023 (DE) ......................... 102023123812.4

(51) Int. Cl.
*F21S 41/40* (2018.01)
*F21S 41/27* (2018.01)

(52) U.S. Cl.
CPC ............... *F21S 41/27* (2018.01); *F21S 41/40* (2018.01)

(58) Field of Classification Search
CPC .......... F21S 41/25; F21S 41/255; F21S 41/26; F21S 41/265; F21S 41/27; F21S 41/275; F21S 41/40; F21S 41/43
See application file for complete search history.

(56) References Cited

U.S. PATENT DOCUMENTS

| | | | | |
|---|---|---|---|---|
| 3,617,795 | A | 11/1971 | Peek | |
| 7,311,430 | B2 * | 12/2007 | Tsukamoto ........... | F21S 41/365 362/539 |
| 2003/0174509 | A1 * | 9/2003 | Futami ................. | B60Q 1/0052 362/346 |
| 2019/0092215 | A1 | 3/2019 | Colombel et al. | |
| 2019/0360655 | A1 | 11/2019 | Toko | |
| 2021/0231279 | A1 | 7/2021 | Ohashi et al. | |

FOREIGN PATENT DOCUMENTS

| | | | |
|---|---|---|---|
| JP | 2017016784 | A | 1/2017 |
| WO | 2022129426 | A1 | 6/2022 |

* cited by examiner

*Primary Examiner* — Robert J May
(74) *Attorney, Agent, or Firm* — WARNER NORCROSS + JUDD LLP

(57) ABSTRACT

A lens system for a headlamp module for a motor vehicle is provided. The lens system includes a base body, a lens device, an aperture device, and a lens brightening device. The base body, the lens device, the aperture device, and the lens brightening device are arranged relative to one another along a light axis of the lens system, wherein the lens device has a primary light area and a secondary light area, wherein the aperture device limits light beams along the light axis to the primary light area, wherein the lens brightening device is directs light beams along the light axis into the secondary light area for brightening the secondary light area, and wherein the aperture device and the lens brightening device are jointly designed. Furthermore, the invention relates to a headlamp module for a motor vehicle, the headlamp module comprising a lens system.

14 Claims, 3 Drawing Sheets

LENS SYSTEM WITH APERTURE AND BRIGHTENING DEVICE FOR DIRECTING LIGHT BEAMS TO PRIMARY AND SECONDARY AREAS OF LENS DEVICE RESPECTIVELY

CROSS-REFERENCE TO RELATED APPLICATIONS

The present application claims the benefit of German Patent Application No. 10-2023-123-812.4, filed Sep. 5, 2023, the disclosure of which is incorporated by reference.

FIELD OF THE INVENTION

The present invention relates to a lens system for a headlamp module for a motor vehicle. The invention also relates to a headlamp module with a lens system for a motor vehicle.

BACKGROUND OF THE INVENTION

Headlamp modules currently publicly known generally comprise apertures to limit the exit of the light beams. The limitation of the exiting light beams by the apertures usually serves a defined limitation for compliance with legal requirements, for reducing stray light and/or for generating design aspects of the headlamp modules. A lens device, which is arranged downstream along the light beams of such a known aperture, is consequently only illuminated in the area of the light beams transmitted by the aperture, whereas the other areas of the lens device are designed to be non-illuminated outside the light beams transmitted by the aperture.

The publications US2019/0360655A1, U.S. Pat. No. 3,617,795A and US2019/0092215A1 describe generic devices.

SUMMARY OF THE INVENTION

It is therefore the task of the present invention to remedy or at least partially remedy the disadvantages in the prior art described above. In particular, it is the task of the invention to provide a lens system for a headlamp module for a motor vehicle, with which an advantageous illumination of a lens device is made possible particularly easily. In particular, it is also the task of the invention to provide a headlamp module with a lens system for a motor vehicle.

The preceding task is solved by embodiments of the present invention. In particular, the task is solved by a lens system and a headlamp module as described herein. Further advantages and details of the invention will be apparent from the description and the drawings. Thus, features that are described in connection with the lens system according to the invention naturally also apply in connection with the headlamp module according to the invention and vice versa, so that reference is or can always be made to the individual aspects of the invention with regard to the disclosure.

According to a first aspect of the invention, the task is solved by a lens system for a headlamp module for a motor vehicle, the lens system comprising a base body, at least one lens device, at least one aperture device and at least one lens brightening device, the base body, the at least one lens device, the at least one aperture device and the at least one lens brightening device being arranged relative to one another along a light axis of the lens system, wherein the at least one lens device has a primary light area and a secondary light area, wherein the at least one aperture device is designed for limiting light rays along the light axis to the primary light area, wherein the at least one lens brightening device is designed for directing light rays along the light axis into the secondary light area for brightening the secondary light area, wherein the at least one aperture device and the at least one lens brightening device are jointly designed.

The base body is preferably to be understood as a housing and/or a fixing device of the lens system. The base body is preferably designed for fixing to and/or in the headlamp module.

The lens system has an imaginary light axis, wherein the base body, the at least one lens device, the at least one aperture device and the at least one lens brightening device are arranged relative to one another along the light axis. Preferably, the preceding devices are affixed to one another and/or jointly. Preferably, the preceding devices are affixed to each other in a stacked and/or clamped manner in a kind of sandwich construction. In the context of the invention, "behind" is to be understood as a position indication in the direction of the light source of a headlamp module and "in front" as the direction of light extraction from the lens system and/or the headlamp module. In other words, the direction and position specifications are to be understood in the direction of travel of a motor vehicle and/or in an assumed installation position of the lens system and/or the headlamp module.

The lens system of the invention has at least one, in particular exactly one lens device. Preferably, the lens system comprises two or more lens devices. The at least one lens device is preferably designed and/or arranged as an end-face lens device of the lens system, i.e. as the outermost lens device along the light axis of the lens system. The at least one lens device comprises a primary light area and a secondary light area. The primary light area is preferably used for the function of headlamp-typical light extraction, for illuminating the surroundings of a motor vehicle and/or for the basic visibility of the motor vehicle in the form of dipped headlight, daytime running light, parking light and/or high beam headlight. The secondary light area is not used for light extraction for illuminating the surroundings of a motor vehicle, but for enlarging the illuminated area of the at least one lens device. The enlargement of the illuminated area is usable, for example, for improved perception of the headlamp module and/or the motor vehicle and/or for providing information.

The at least one aperture device of the lens system enables at least partial, preferably complete or substantially complete, limitation of light beams along the light axis to the primary light area. In the context of the invention, the at least one aperture is preferably to be understood as a stop aperture. In other words, the at least one aperture device is designed to block, reflect and/or otherwise deflect and/or otherwise absorb a portion of the light beams from a light source of the headlamp module in order to limit or substantially limit a lighting extraction of the light beams for illuminating the surroundings of the motor vehicle to the primary light area. In the context of the invention, the phrase "X or substantially X" is to be understood as a possible minor deviation, for example due to manufacturing tolerances, material and/or process properties, without changing the underlying intended function of the feature. In other words, the at least one aperture device of the invention advantageously enables a limitation of the light beams to an intended and/or, for example, legislatively specified transmission area of the aperture device and/or to a radiation angle range for the light beams. Preferably, the at least one aperture device is designed in such a way that the light rays do not or substantially do not pass via the aperture device into the secondary light area.

The lens brightening device is designed for directing light beams, in particular intensity-attenuated light beams, along the light axis into the secondary light area for brightening the secondary light area. The at least one lens brightening device advantageously enables additional illumination of the at least one lens device in the form of illumination of the secondary light area. In other words, light rays from a light source of the headlamp module are enabled and directed into the secondary light area by the at least one lens brightening device. The at least one lens brightening device preferably directs scattered light from a light source of the headlamp module into the secondary light area of the at least one lens device. The lens brightening device and the light beams of the secondary light area enabled and directed by the lens brightening device have a significantly lower intensity than the light beams of the primary light area. In other words, the light beams from the lens brightening device and the secondary light area are not suitable for the classic headlamp-typical light extraction described above. In the context of the invention, the light beams from the lens brightening device and the secondary light area do not contribute, contribute negligibly or contribute at most slightly to an illumination of the surroundings of a motor vehicle. The light beams from the lens brightening device and the secondary light area are preferably used for illuminating and brightening the secondary area itself rather than for illuminating the surroundings of the motor vehicle. The lens brightening device is preferably to be understood as a light directing device for brightening the secondary light area of the at least one lens device.

The lens system of the invention is particularly advantageous because the at least one aperture device and the at least one lens brightening device are jointly designed. The joint design of the at least one aperture device and the at least one lens brightening device preferably saves installation space within the lens system and/or enables the lens system to be manufactured in a material- and/or cost-saving manner. The joint design preferably enables a lens brightening device and an aperture device in a matrix module.

Such a designed lens system is particularly advantageous due to the design of the at least one aperture device and the at least one lens brightening device, since an advantageous illumination of at least one lens device, in particular of the secondary light area, is made possible in a particularly simple, cost-saving and/or installation space-saving manner.

According to a preferred further development of the invention, it can be provided in a lens system that the at least one lens brightening device is designed to be at least sectionally translucent for directing light beams along the light axis into the secondary light area for brightening the secondary light area. The at least one lens brightening device is preferably designed to be at least sectionally translucent and/or transparent to enable advantageous direction of light rays into the secondary light area of the at least one lens device. The light transmission of the at least one lens brightening device is preferably designed to be at least sectionally homogeneous or inhomogeneous. Preferably, the lens brightening device is also sectionally opaque to advantageously limit the direction of light rays along the light axis into the secondary light area. As discussed above, the light beams from the lens brightening device are not used for illuminating the surroundings of the motor vehicle, but for brightening the secondary light area itself. Therefore, it is advantageous to adjust the light transmission of the lens brightening device for the defined direction of light rays along the light axis into the secondary light area. Such a designed lens system is particularly advantageous due to the design of the at least one lens brightening device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one aperture device and the at least one lens brightening device are designed integrally, monolithically, connected with each other and/or affixed to one another. The design of the lens system is particularly advantageous if the at least one aperture device and the at least one lens brightening device are designed integrally, monolithically, connected with each other and/or affixed to one another. Such a designed at least one aperture device and at least one lens brightening device advantageously enables an installation space-saving, stable and/or cost-effective construction of the lens system. The at least one aperture device and the at least one lens brightening device are preferably connected with each other by a material bond. Alternatively or additionally, the at least one aperture device and the at least one lens brightening device are affixed to one another, for example with a clip connection, plug-in connection, in a form-fitting and/or force-fitting manner. Such a designed lens system is particularly advantageous due to the design of the at least one aperture device and the at least one lens brightening device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one aperture device and the at least one lens brightening device are designed as a joint functional unit. In the context of the invention, a functional unit is to be understood as a co-operating unit consisting of the at least one aperture device and the at least one lens brightening device. The functional unit preferably has common constructive designs for structurally forming the at least one aperture device and the at least one lens brightening device. Additionally or alternatively, functional devices of the at least one aperture device and the at least one lens brightening device are preferably designed separately within the functional unit, so that the functional unit advantageously enables the functions of the at least one aperture device and the at least one lens brightening device explained above and at the same time enables a material-, cost- and installation space-saving design of the at least one aperture device and the at least one lens brightening device. Such a designed lens system is particularly advantageous due to the functional unit, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one aperture device is designed as a surface coating on the at least one lens brightening device. By way of example, the at least one aperture device on the at least one lens brightening device is vapor-deposited, vapor-deposited in a mirror-like manner, painted and/or otherwise coated on the surface of the at least one lens brightening device. Such a design of the aperture device advantageously enables a very low installation space requirement due, for example, to a low thickness of the corresponding surface coating on the at least one lens brightening device. The surface coating preferably enables a reduction, prevention and/or reflection of light rays outside the primary light area by the aperture device. Furthermore, such a designed at least one lens brightening device enables a fixing-free design of the at least one aperture device. In other words, the at least one aperture device as a surface coating does not require a fixing device in order to be affixed to the at least one lens brightening device. Such a designed lens system is particularly advantageous due to the design of the at least one aperture device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one lens brightening device has at least one scattering device for scattering the light beams along the light axis into the secondary light area. By way of example, the at least one lens brightening device has facets for scattering the light beams along the light axis. The at least one scattering device is preferably designed and/or arranged on a rear side of the at least one lens brightening device. The at least one scattering device is preferably designed by a material bond and/or integrally with the at least one lens brightening device. Preferably, the at least one scattering device is designed directly at least sectionally, in particular completely, in the at least one lens brightening device. A scattering device of the invention enables scattering of the light beams, for example to enable an as homogeneous as possible light distribution of the light beams in the secondary area. Such a designed lens system is particularly advantageous due to the at least one scattering device, since an advantageous and defined illumination of at least one lens device, in particular of the secondary light area, is made possible in a particularly simple, cost-saving and/or installation space-saving manner.

According to a preferred further development of the invention, it can be provided in a lens system that the lens system comprises a collimator device, in particular, wherein the at least one aperture device and the at least one lens brightening device are arranged along the light axis between the collimator device and the at least one lens device, or wherein the collimator device is arranged along the light axis between the at least one lens device and the at least one aperture device and the at least one lens brightening device. Preferably, the lens system comprises two or more lens devices, in particular wherein the collimator device is arranged between two lens devices. The collimator device is preferably used for generating light with an approximately parallel beam path. In an installation situation, the collimator device is preferably arranged in front of a light source of the headlamp module. Furthermore, the collimator device is arranged behind the at least one lens brightening device, at least one aperture device and behind the at least one lens device. An arrangement of the collimator device behind the at least one aperture device advantageously enables a bundling of the light beams in front of the at least one aperture device by the collimator device. Such a designed lens system is particularly advantageous due to the collimator device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one lens brightening device comprises at least one color device, wherein the at least one color device is designed for changing the color of light beams along the light axis into the secondary light area. Such a designed lens system enables a color change of the light beams along the light axis into the secondary light area, so that the secondary area is brightened in one or more colors. The color device is preferably adjustable and/or controllable so that the adjustment and/or control of the color change is enabled by, for example, a motor vehicle and/or a user. The color change of the light beams by the color device enables, for example, an optical indication of at least one status, of at least one data set and/or of at least one headlamp module and/or motor vehicle parameter. However, the at least one color device of the invention with the lens system is preferably not to be understood as an indication device in the sense of an indication relevant for road traffic regulations, such as an indicator, since the light intensity of the light beams in the secondary area is too low. By way of example, the at least one color device with the lens system is designed for outputting a state of a charging process of an at least partially electrically operated motor vehicle, a state of an at least partially automatic parking process and/or a state of a warning and/or anti-theft device. Such a designed lens system is particularly advantageous due to the at least one color device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one aperture device and the at least one lens brightening device are arranged along the light axis behind the at least one lens device. A preferred design of the lens system provides for an arrangement of the at least one lens device in front of the jointly designed at least one aperture device and the at least one lens brightening device. The at least one lens device is preferably, additionally or alternatively, designed as the foremost device of the lens system.

Preferably, the at least one lens device is congruent or substantially congruent in its external shape with the jointly designed at least one lens brightening device and the at least one aperture device.

According to a preferred further development of the invention, it can be provided in a lens system that the at least one lens device is arranged as the foremost lens device of the lens system. Preferably, the at least one lens device described above is designed as the foremost lens device of the lens system. In other words, the at least one lens device is preferably designed as the front-end lens device of the lens system. Preferably, the lens system has exactly one lens device.

According to a preferred further development of the invention, it can be provided in a lens system that the at least one aperture device and the at least one lens brightening device are designed as a solid construction and/or as an injection-molded component. A design of the at least one aperture device and the at least one lens brightening device as a solid construction and/or as an injection-molded component advantageously enables a cost-effective and/or constructionally stable design. The manufacture of the at least one aperture device and of the at least one lens brightening device as a solid construction and/or as an injection-molded component further enables a low expenditure of time and/or material for the manufacture, as well as, for example, an advantageous integration of fixing devices described above.

According to a preferred further development of the invention, it can be provided in a lens system that the at least one lens brightening device is made, at least sectionally, of transparent, colored and/or color-coated plastic. Directing light beams along the light axis into the secondary light area for brightening the secondary light area is particularly cost-effective and simple due to the design of the at least one lens brightening device, at least sectionally made of transparent plastic. Preferably, the at least one lens brightening device is made at least sectionally of transparent polycarbonate. The use of transparent plastic enables an as advantageous as possible and/or undisturbed beam path of the light rays through the at least one lens brightening device for brightening the secondary light area. The use of colored and/or color-coated plastic enables an as advantageous as possible coloring of the light beams by the at least one lens brightening device for at least sectionally colored brightening of the secondary light area.

According to a preferred further development of the invention, it can be provided in a lens system that the at least one aperture device, the at least one lens brightening device and the at least one lens device are designed integrally, monolithically, connected with each other and/or affixed to one another. For designing a lens system with particularly low installation space requirements, it is advantageous to design the at least one aperture device, the at least one lens brightening device and the at least one lens device integrally, monolithically, connected with each other and/or affixed to one another. The said devices are therefore advantageously designed as a joint unit and/or connected with each other, thus enabling a small installation space requirement and also a simplified installation process. Such a designed lens system is particularly advantageous due to the joint design of the at least one aperture device, the at least one lens brightening device and the at least one lens device, since an advantageous and defined illumination of at least one lens device, in particular of the secondary light area, is made possible in a particularly simple, cost-saving and/or installation space-saving manner.

According to a preferred further development of the invention, it can be provided in a lens system that the at least one aperture device, the at least one lens brightening device and/or the at least one lens device are affixed to the base body by means of at least one fixing device of the lens system. By way of example, the at least one aperture device, the at least one lens brightening device and/or the at least one lens device are affixed to one another to the base body in a stacked manner, in a kind of sandwich construction. By way of example, the at least one aperture device, the at least one lens brightening device and/or the at least one lens device are affixed to the base body by means of at least one fixing device, such as a clamping bridge and/or a clip. Illustratively described, the at least one aperture device, the at least one lens brightening device and/or the at least one lens device are aligned with one another and jointly affixed to the base body by means of the at least one fixing device. Such a designed lens system is particularly advantageous due to the joint fixing of the at least one aperture device, the at least one lens brightening device and/or the at least one lens device to the base body, since an advantageous and defined illumination of at least one lens device, in particular of the secondary light area, is made possible in a particularly simple, cost-saving and/or installation space-saving manner.

According to a second aspect of the invention, the task is solved by a headlamp module for a motor vehicle. The headlamp module comprises at least one lens system according to the first aspect. The described headlamp module provides all the advantages that have already been described for the lens system according to the first aspect of the invention. The headlamp module preferably comprises at least one light source.

BRIEF DESCRIPTION OF THE DRAWINGS

With reference to the accompanying drawings, the invention is explained in more detail below. Schematically, in each case.

DETAILED DESCRIPTION OF THE CURRENT EMBODIMENTS

Figure 1:
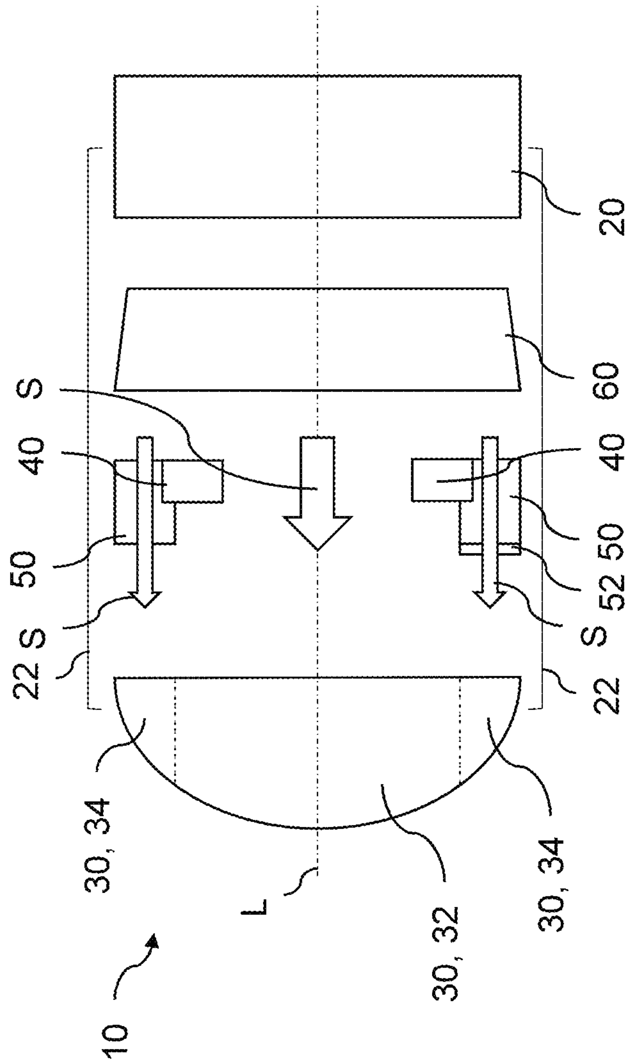
FIG. 1 shows a lens system in a side view.
Figure 2:
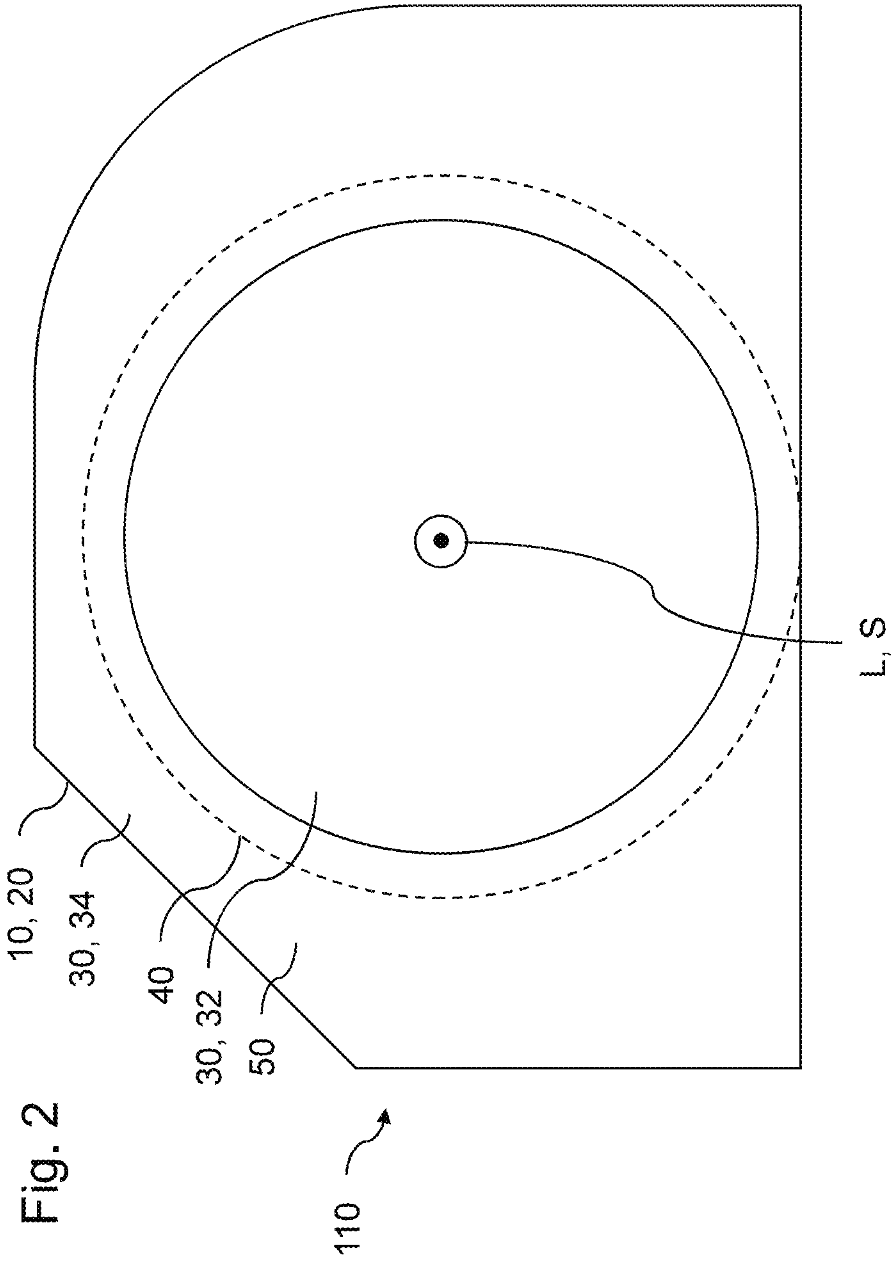
FIG. 2 shows a headlamp module with a lens system in a front view.
Figure 3:
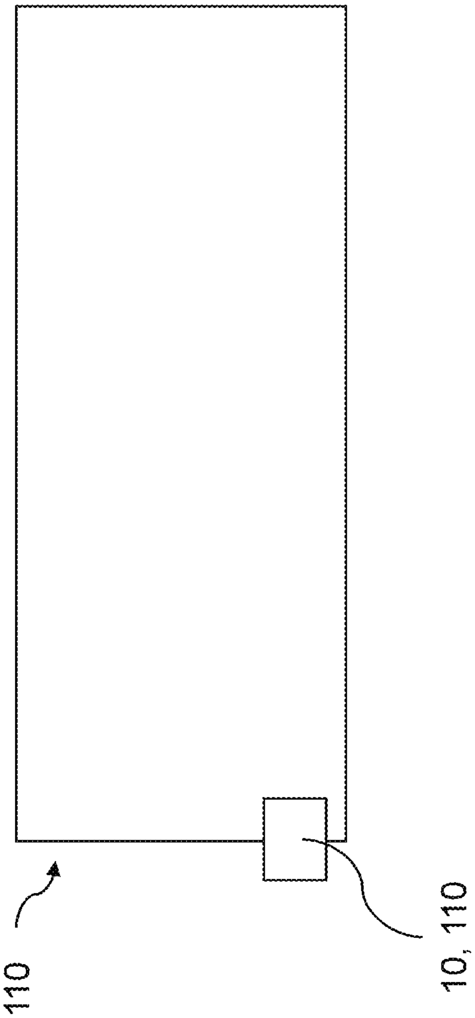
FIG. 3 shows a motor vehicle with a headlamp module with a lens system in a side view.

Elements with the same function and mode of operation are each labelled with the same reference signs in FIGS. 1 to 3.

In FIG. 1, a lens system 10 is shown schematically in a side view. The lens system 10 has a base body 20, a lens device 30, an aperture device 40 and a lens brightening device 50. The base body 20, the lens device 30, the aperture device 40 and the lens brightening device 50 are arranged relative to one another along a light axis L of the lens system 10. The lens device 30 has a primary light area 32 and a secondary light area 34, wherein the aperture device 40 is designed for limiting light beams S along the light axis L to the primary light area 32 and wherein the lens brightening device 50 is designed for directing light beams S along the light axis L into the secondary light area 34 for brightening the secondary light area 34. The aperture device 40 and the lens brightening device 50 are jointly designed according to the invention. The lens brightening device 50 is designed to be translucent for directing light beams S along the light axis L into the secondary light area 34 for brightening the secondary light area 34. The aperture device 40 and the lens brightening device 50 are designed monolithically as a joint functional unit. The lens brightening device 50 has a scattering device for scattering the light beams S along the light axis L into the secondary light area 34. The lens system 10 further comprises a collimator device 60, wherein the aperture device 40 and the lens brightening device 50 are arranged along the light axis L between the collimator device 60 and the lens device 30. The lens brightening device 50 comprises a color device 52 in the lower area, wherein the color device 52 is designed for changing the color of light beams S along the light axis L into the secondary light area 34. The aperture device 40 and the lens brightening device 50 are arranged along the light axis L behind the lens device 30. The lens device 30 is arranged as the foremost lens device 30 of the lens system 10. The aperture device 40 and the lens brightening device 50 are designed as a solid construction and as an injection-molded component. The aperture device 40, the lens brightening device 50 and the lens device 30 are affixed to the base body 20 by means of two fixing devices 22 of the lens system 10.

In FIG. 2, a headlamp module 110 with a lens system 10 is shown schematically in a frontal view. The lens system 10 has a base body 20, a lens device 30, an aperture device 40 and a lens brightening device 50. The base body 20, the lens device 30, the aperture device 40 and the lens brightening device 50 are arranged relative to one another along a light axis L of the lens system 10. The lens device 30 has a primary light area 32 and a secondary light area 34, wherein the aperture device 40 is designed for limiting light beams S along the light axis L to the primary light area 32 and wherein the lens brightening device 50 is designed for directing light beams S along the light axis L into the secondary light area 34 for brightening the secondary light area 34. The aperture device 40 and the lens brightening device 50 are jointly designed according to the invention. The aperture device 40 is designed as a surface coating on the lens brightening device 50. The aperture device 40, the lens brightening device 50 and the lens device 30 are designed to be connected with each other.

In FIG. 3, a motor vehicle 100 with a headlamp module 110 with a lens system 10 is shown schematically in a side view.

LIST OF REFERENCE NUMERALS

10 lens system
20 base body
22 fixing device
30 lens device
32 primary light area
34 secondary light area
40 aperture device
50 lens brightening system
52 color device
60 collimator device
100 motor vehicle
110 headlamp module
L light axis
S light beams The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles “a,” “an,” “the,” or “said,” is not to be construed as limiting the element to the singular.

The invention claimed is:

1. A lens system for a headlamp module for a motor vehicle comprising:

a base body;

a lens device;

an aperture device; and a lens brightening device, wherein the base body, the lens device, the aperture device, and the lens brightening device are arranged relative to one another along a direction that is parallel to a light axis of the lens system, the lens device having a primary light area and a secondary light area, wherein the aperture device is configured to limit light beams along propagating parallel to the light axis to the primary light area, and wherein and the lens brightening device is configured to direct light beams along propagating parallel the light axis into the secondary light area for brightening the secondary light area, and wherein the aperture device and the lens brightening device are joined to each other; and wherein the lens brightening device is at least sectionally translucent for directing light beams along propagating parallel the light axis into the secondary light area for brightening the secondary light area.

2. The lens system of claim 1, wherein the aperture device and the lens brightening device are integrally and monolithically joined to each other.

3. The lens system of claim 1, wherein the aperture device and the lens brightening device are a joint functional unit.

4. The lens system of claim 1, wherein the aperture device is configured as a surface coating on the lens brightening device.

5. The lens system of claim 1, wherein the lens brightening device has a scattering device for scattering light beams propagating parallel the light axis into the secondary light area.

6. The lens system of claim 1, further including a collimator device, wherein the aperture device and the lens brightening device are arranged between the collimator device and the lens device.

7. The lens system of claim 1, wherein the lens brightening device comprises a color device, wherein the color device is configured to change the color of light beams propagating parallel to the light axis in the secondary light area.

8. The lens system of claim 1, wherein the aperture device and the lens brightening device are arranged behind the lens device.

9. The lens system of claim 1, wherein the lens device is arranged in a foremost position of the lens system.

10. The lens system of claim 1, wherein the aperture device and the lens brightening device are configured as a solid construction or as an injection molded component.

11. The lens system of claim 1, wherein the lens brightening device includes transparent, colored, or color-coated plastic.

12. The lens system of claim 1, wherein the aperture device, the lens brightening device, and the lens device are integrally and monolithically connected to each other.

13. The lens system of claim 1, wherein the aperture device, the lens brightening device, or the lens device are affixed to the base body by a fixing device.

14. A headlamp module for a motor vehicle, the headlamp module comprising the lens system of claim 1.

* * * * *